March 17, 1931.  F. L. DUFFIELD  1,796,563
REDUCTION OF ORES
Original Filed Sept. 21, 1928  2 Sheets-Sheet 1

INVENTOR
FREDERICK LINDLEY DUFFIELD,
BY
Toulmin & Toulmin
ATTORNEYS

March 17, 1931. F. L. DUFFIELD 1,796,563
REDUCTION OF ORES
Original Filed Sept. 21, 1928   2 Sheets-Sheet 2

INVENTOR
FREDERICK LINDLEY DUFFIELD
BY
ATTORNEYS

Patented Mar. 17, 1931

1,796,563

UNITED STATES PATENT OFFICE

FREDERICK LINDLEY DUFFIELD, OF LONDON, ENGLAND

REDUCTION OF ORES

Original application filed September 21, 1928, Serial No. 307,413, and in Great Britain October 10, 1927. Divided and this application filed July 31, 1929. Serial No. 382,346.

This invention relates to apparatus for the reduction of ores such as can be reduced to metal by heating in admixture with carbonaceous material with or without lime and the like.

Although apparatus according to the present invention has been particularly devised for the reduction of iron ores, and will be described in this application, it is to be understood that it is also applicable to other ores adapted to be reduced to the metal by heating in admixture with carbonaceous material with or without lime and the like.

In standard practice the ore is charged at the top of the reducing chamber, and traverses from top to bottom, the gases evolved flowing in the opposite direction, i. e., from bottom to top. The maximum temperature is at the bottom of the furnace and the coldest zone is at the top, and economy is sought in producing the maximum amount of $CO_2$ present in the exit gases of the reducing furnace compatible with efficient gaseous reduction, such as obtains in the blast furnace or electric smelting furnace.

The object of the present invention is to provide an improved apparatus.

Apparatus according to the present invention for the reduction of ores comprises a reducing chamber, a heating chamber disposed adjacent to and extending alongside the reducing chamber, means for introducing the charge into the reducing chamber, and means for raising against the force of gravity the said charge within the reducing chamber.

A preferred way of carrying out the present invention will be described as applied to the reduction of iron ores by way of example with reference to the drawings filed herewith, wherein:—

Figs. 3, 4 and 5 are detail views.

Figure 1:
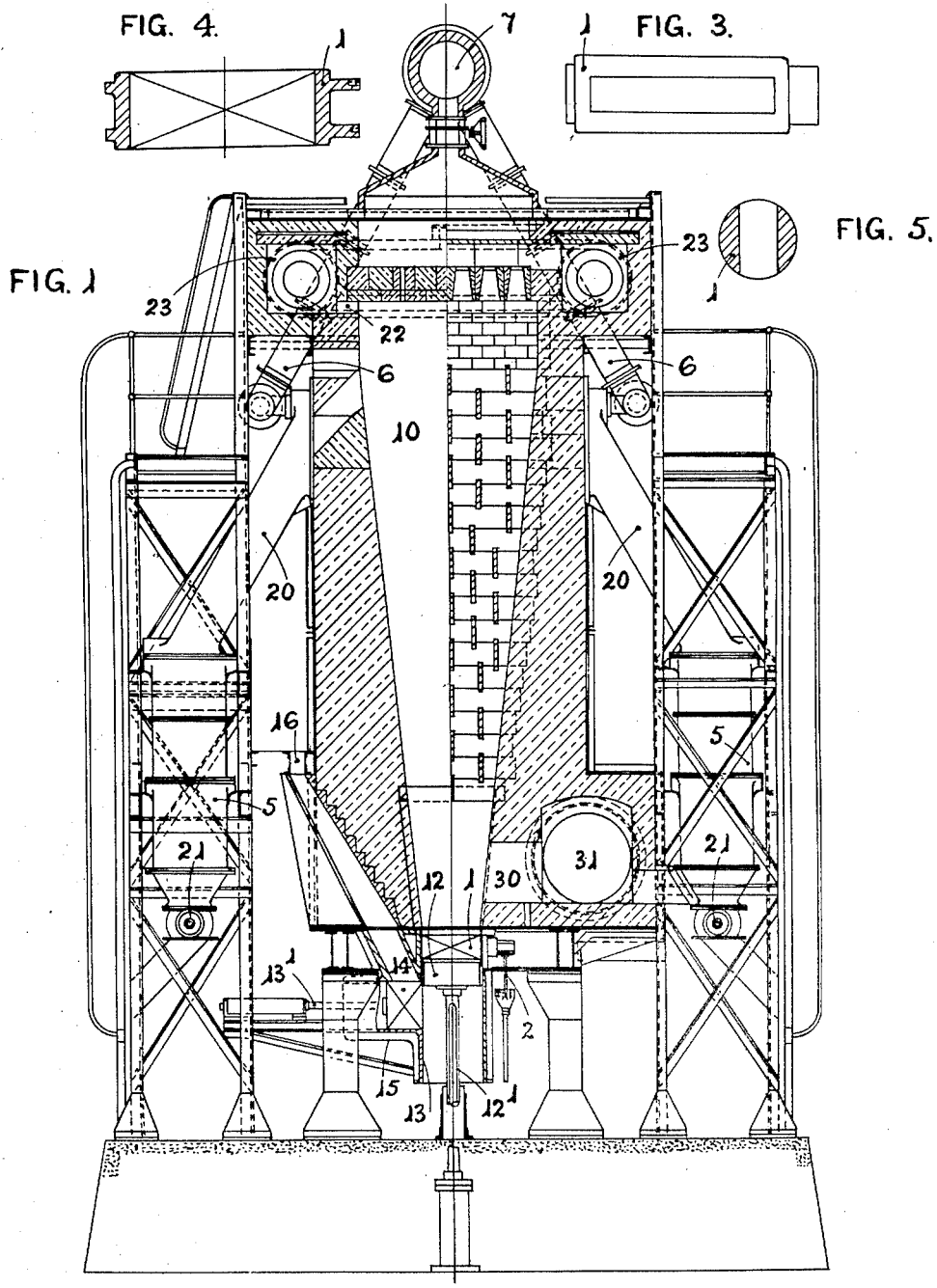
Fig. 1 is an end part sectional view the left half of which is taken on line A—B, Fig. 2, and the right half of which is taken on line C—D, Fig. 2.
Figure 2:
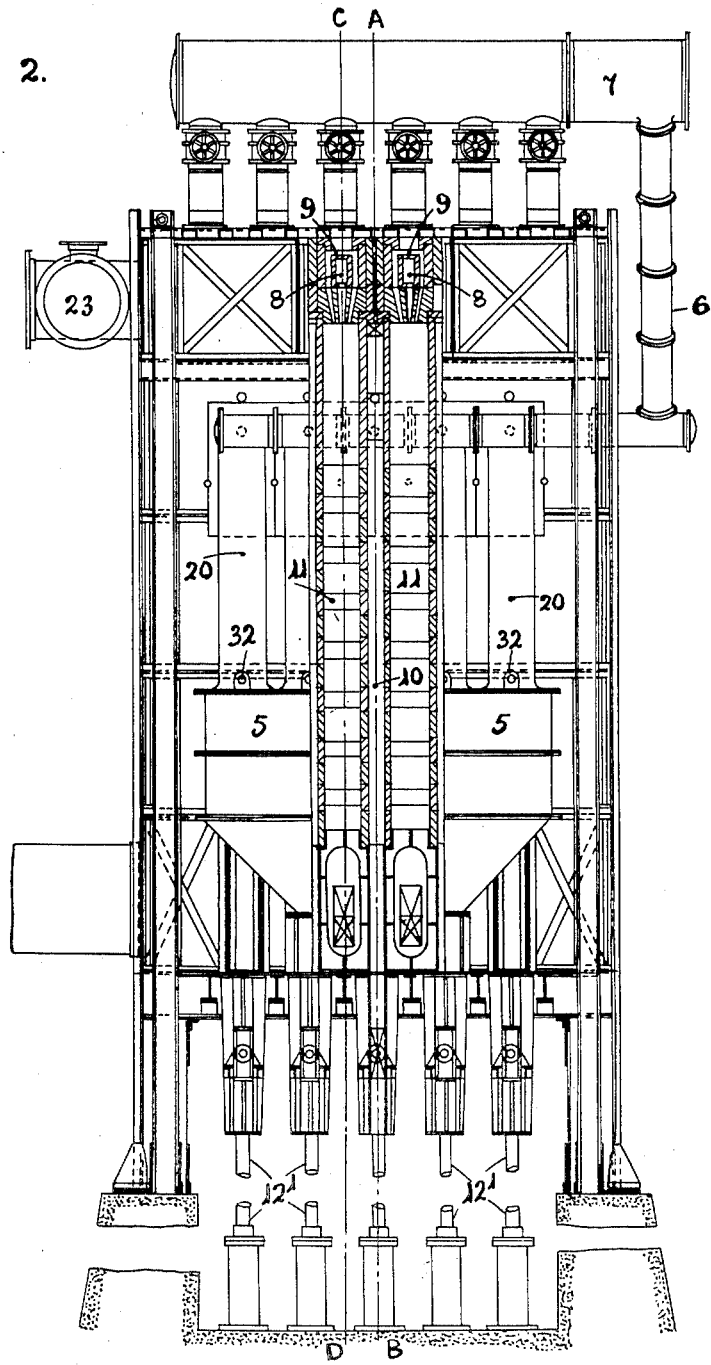
Fig. 2 is a side view also partly in section.

The apparatus shown in the drawing shows a five battery retort and comprises a series of reducing chambers 10 disposed between combustion chambers 11. The partition walls between the chambers 10 and 11 are built of hollow refractory bricks. A hydraulic ram 12 working in a cylinder 13 is disposed at the base of each chamber 10, and is arranged in association with another hydraulic ram 14 working in a cylinder 15, hereinafter referred to as the feed ram. The charge is fed as required through a chute 16 to the cylinder 15, and is fed to the cylinder 13 in the following way. The ram 12 is shown in Fig. 1 at the top of its stroke, and as it travels downward and approaches the bottom of its stroke, the ram 14 is withdrawn and allows a further supply of ore to be fed into cylinder 15, which is pushed by the subsequent forward movement of the ram 14 into the cylinder 13 on top of the ram 12. A one-way cock 1, shown in detail in Figs. 3, 4 and 5, is provided at the base of the chamber 10. This cock is shown in detail in Figs. 3, 4 and 5; Fig. 4 being a sectional elevation of the cock in its open position, Fig. 5 being a cross section taken on Fig. 4, and Fig. 3 being a plan view of Fig. 4. As will be seen from these figures the cock comprises a solid cylinder provided with a longitudinal slot, the cylinder being rotatably mounted in the casing of the retort so that in one position communication with the feed is provided through a slot, whilst in another position the reduction chamber is sealed against the feed. This cock is operated by a ram rod 2 to close the base of the chamber during the downward movement of the ram 12, and to provide a passage between the cylinder 13 and the chamber 10, when the ram 12 is pushing upwards a further charge. The ram rods 12', 13', and 2 are operably connected by suitable link mechanism so that the movements of the rams 12 and 14 and the one-way cock 1 are automatic and are synchronised relatively to one another. The rams may be operated electrically or mechanically.

The ore is reduced on its travel through the chamber 10, and the reduced material on approaching the top of the said chamber is conveyed by ducts 20 through water cooled passages 5 to spiral conveyors 21, and conveyed elsewhere for treatment. The ducts 20 are double walled, the inner wall being cooled by a current of air entering through the inlets 32 and travelling between the double walls. The heated air thus obtained passes at top of the ducts 20 into a collecting pipe 6, and is fed into a common hot air main 7 mounted above the battery, for use as hereafter described.

The gases evolved in the reducing chambers 10 pass out through a passage 22 provided at the top of each chamber 10 and are colleted in a common pipe 23, which supplies the combustion chambers 11, the hot gases being admitted into the said chambers through inlets 8. Hot air is supplied to the chambers 11 from the main 7 through apertures 9, and the hot gases and hot air pass down the chambers 11 whilst burning. The waste gases are collected at the bottom of the combustion chambers through exit ports 30 communicating with a common main 31, and are passed to a waste heat recovery plant or otherwise disposed of.

The operation of reduction takes place as follows:—The ore is ground and mixed with ground coal containing the requisite carbon for performing the reduction of the ore to the metal. The mixture is fed into the chutes 16, and is delivered as required into the cylinders 15, and pushed by the feed rams 14 into the cylinders 13, on top of the rams 12, the rams 14 closing the sides of the cylinders 13, while the rams 12 are forcing the charge up. The rams 12 have a limited reciprocating movement, and on each upward stroke they force the charge up, so that each stroke causes a quantity of the reduced charge to fall through the ducts 20 and on to the conveyors 21. The reduced material may then be cooled and conveyed to a magnetic separator for extraction of the iron particles, which can be stamped into blocks for use as a substitute for pig iron or scrap iron.

On the downward stroke of the ram 12 the charge is supported in the reducing chamber by means of the one-way cock 1 as above described. When starting the furnace after the chambers have been filled, an outside source of gas is employed, and is burnt at the top of the combustion chambers. Once the operation has been started the gases evolved in the reducing chamber are collected at the top of the said chamber and caused to descend through the combustion chambers 11, where they burn, with the heated air, as above described, the waste gases being collected at the bottom of the chambers 11 for use elsewhere. The gases thus evolved in the reducing chambers and burned in the combustion chambers form the principal or sole (according to the metal contents of the ore) heating medium of the ore and carbon charge undergoing endothermic reaction in the reducing chamber, except, as above stated, on starting the furnace, when an external source of heat is employed.

According to the present invention therefore the order of operation of standard practice is entirely reversed. The ore is charged at the bottom of the reducing chamber and caused to traverse to the top of such chamber; the hottest zone is at the top and the lowest temperature is at the bottom, and the process is directed to produce the maximum amount of CO in the exit gases which have performed their function of reduction, and it is in this reversal that vast economies are effected in that much less carbon is consumed than in the blast furnace.

The CO gas formed by the reaction of carbon on the ore together with other gases ascends through a progressively hotter charge, and not through a progressively colder charge, as in existing practice. The heat required for reaction of carbon on the ore is the potential heat of the gases formed by such reaction; these gases are burned in a chamber, the heat being conducted therefrom to the ore and carbon charge in such manner that the maximum heat is applied at the top of the charge.

It has been found that by adopting ordinary methods of heat recuperation from the exit gases the potential heat of such CO gas evacuated from the reducing chamber is sufficient to heat the ore-carbon charge together with supplying heat absorbed in the reaction to such a temperature requisite for the production of granular iron.

By this invention the coal containing the necessary carbon for reducing the ore furnishes sufficient gas to heat the charge sufficiently for the required reaction, thus obviating the need of using extraneous sources of heat supply, such as is ordinarily provided by electricity or the combustion of fuel within or exteriorly of the chamber containing the ore charge.

The granular product at its maximum temperature of 1,100° centigrade does not become viscid nor does it flux.

Burning the gases at the top of the combustion chamber and causing the hot products of combustion to descend in the combustion chamber in contraflow to the upward movement of the ore-carbon charge being heated permits of the maximum uniform difference in temperature being maintained between the external heat of the gases and the internal heat of the ore-carbon charge from top to bottom, that is to say the ore-carbon charge reaches a temperature of 1,000° C. at the top of the inner retort, whereas the gas burnt in the adjoining combustion chamber attains a temperature of approximately 1,600° C. Upon these burning gases giving up their heat in course of descent the temperature at the bottom of the combustion chamber is thereby reduced to some 500° C., whereas the ore-carbon charge at this bottom extremity in the inner retort starts from cold. Therefore there is always an approximately uniform difference from top to bottom of some 400–600° C. between the temperature of the burning gases and the temperature of the ore-carbon charge. This is the secret of rapid heat transmission and a factor which materially expedites the reduction process.

The process of reducing iron ores according to my present invention is claimed separately in my pending application Serial No. 307,413.

What I claim and desire to secure by Letters Patent is:—

1. Apparatus for the reduction of ores comprising a reducing chamber, a heating chamber disposed adjacent to, and extending alongside the reducing chamber, means for introducing the charge in a granulated state into the reducing chamber and means for raising against the force of gravity the said charge within the reducing chamber.

2. Apparatus for the reduction of ores comprising a reducing chamber a heating chamber disposed adjacent to, and extending alongside the reducing chamber, means for introducing the charge in a granulated state into the reducing chamber, and an intermittently reciprocating propelling ram adapted to raise the charge through the reducing chamber.

3. Apparatus for the reduction of ores comprising a reducing chamber, a heating chamber disposed adjacent to, and extending alongside the reducing chamber, means for introducing the charge in a granulated state into the reducing chamber, an intermittently reciprocating propelling ram adapted to raise the charge through the reducing chamber and a second intermittently reciprocating ram adapted to feed the charge into the reducing chamber above the propelling ram.

4. Apparatus for the reduction of ores comprising a reducing chamber, a heating chamber disposed adjacent to, and extending alongside the reducing chamber, means for introducing the charge in a granulated state into the reducing chamber, and intermittently reciprocating propelling ram adapted to raise the charge through the reducing chamber, a second intermittently reciprocating ram adapted to feed the charge into the reducing chamber above the propelling ram and a one-way cock for supporting the charge in the reducing chamber on the downstroke of the propelling ram.

5. Apparatus for the reduction of ores comprising a reducing chamber, a heating chamber disposed adjacent to, and extending alongside the reducing chamber, means for introducing the charge in a granulated state into the reducing chamber, means for raising against the force of gravity the said charge within the reducing chamber, and means for collecting the gases evolved in the reducing chamber and for passing them into the heating chamber.

6. Apparatus for the reduction of ores comprising a reducing chamber, a heating chamber disposed adjacent to, and extending alongside the reducing chamber, means for introducing the charge in a granulated state into the reducing chamber, an intermittently reciprocating propelling ram adapted to raise the charge through the reducing chamber and means for collecting the gases evolved in the reducing chamber and for passing them into the heating chamber.

7. Apparatus for the reduction of ores comprising a reducing chamber, a heating chamber disposed adjacent to, and extending alongside the reducing chamber, means for introducing the charge in a granulated state into the reducing chamber, an intermittently reciprocating propelling ram adapted to raise the charge through the reducing chamber, a second intermittently reciprocating ram adapted to feed the charge into the reducing chamber above the propelling ram and means for collecting the gases evolved in the reducing chamber and for passing them into the heating chamber.

8. Apparatus for the reduction of ores comprising a reducing chamber, a heating chamber disposed adjacent to, and extending alongside the reducing chamber, means for introducing the charge in a granulated state into the reducing chamber, an intermittently reciprocating propelling ram adapted to raise the charge through the reducing chamber, a second intermittently reciprocating ram adapted to feed the charge into the reducing chamber above the propelling ram, a one-way cock for supporting the charge in the reducing chamber on the downstroke of the propelling ram, means for collecting the gases evolved in the reducing chamber and for passing them into the heating chamber.

9. Apparatus for ore reduction comprising a vertical reducing chamber, a reciprocating horizontal ram for introducing material to be treated into the bottom of the reducing chamber, a vertical ram for raising the charge in the reducing chamber, a one-way cock to hold up the contents of the reducing chamber on the back stroke of the vertical ram, chutes for the removal of the treated solid material at the top of the reducing chamber, combustion chambers contiguous to the reducing chamber and communicating passages for the gases between the reducing chamber and the said combustion chambers.

In witness whereof I affix my signature.

FREDERICK LINDLEY DUFFIELD.